(12) United States Patent
Hong et al.

(10) Patent No.: US 12,452,264 B2
(45) Date of Patent: Oct. 21, 2025

(54) HIERARCHICAL EVENT REPRESENTATION IN EXTENDED DETECTION AND RESPONSE SYSTEMS

(71) Applicant: Cisco Technology, Inc., San Jose, CA (US)

(72) Inventors: Yi Hong, Foster City, CA (US); Tian Bu, Basking Ridge, NJ (US); Girish P Chandranmenon, Edison, NJ (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 18/410,901

(22) Filed: Jan. 11, 2024

(65) Prior Publication Data

US 2025/0233869 A1 Jul. 17, 2025

(51) Int. Cl.
*H04L 9/40* (2022.01)
*H04L 41/22* (2022.01)

(52) U.S. Cl.
CPC ......... *H04L 63/1416* (2013.01); *H04L 41/22* (2013.01); *H04L 63/1425* (2013.01)

(58) Field of Classification Search
CPC .. H04L 63/1416; H04L 41/22; H04L 63/1425
USPC ........................................................ 726/22
See application file for complete search history.

(56) References Cited

U.S. PATENT DOCUMENTS

| | | | |
|---|---|---|---|
| 10,530,796 B2 * | 1/2020 | Patterson | G06F 21/554 |
| 10,877,946 B1 * | 12/2020 | Silva | G06F 16/9027 |
| 11,683,333 B1 * | 6/2023 | Dominessy | H04L 43/045 726/25 |
| 11,841,947 B1 * | 12/2023 | Saxe | G06N 3/045 |
| 2017/0063910 A1 * | 3/2017 | Muddu | G06V 10/225 |
| 2021/0203673 A1 * | 7/2021 | Dos Santos | H04L 63/1433 |
| 2022/0294817 A1 * | 9/2022 | Parekh | H04L 67/10 |
| 2022/0329608 A1 * | 10/2022 | Liu | H04L 63/1416 |
| 2023/0022709 A1 * | 1/2023 | Chiu | H04L 63/1425 |
| 2023/0139000 A1 * | 5/2023 | Apger | G06F 3/0482 726/1 |
| 2024/0356947 A1 * | 10/2024 | Gopalakrishna | H04L 63/1425 |

OTHER PUBLICATIONS

International Search Report and Written Opinion for International Application No. PCT/US2025/010082, mailed Feb. 28, 2025, 15 Pages.

(Continued)

*Primary Examiner* — Badrinarayanan
(74) *Attorney, Agent, or Firm* — Lee & Hayes, P.C.

(57) ABSTRACT

Techniques for generating a hierarchical representation of a set of monitoring events. In some cases, an example system may generate a tree structure based on a set of monitoring events. The tree structure may be generated by: (i) extracting a set of feature values from the monitoring events, where the feature values may correspond to a defined set of event features, (ii) computing a set of entropy measures, each associated with one of the event features over all of the monitoring events, (iii) selecting an event feature for partitioning the events based on the entropy measures, (iv) dividing the events into subsets based on values of the selected feature, and (v) recursively partitioning the subsets based on entropy-selected features until a tree structure is formed.

20 Claims, 6 Drawing Sheets

(56) References Cited

OTHER PUBLICATIONS

Nguyen S.V., et al., "An Automated Fault Detection System for Communication Networks and Distributed Systems", Applied Intelligence, Kluwer Academic Publishers, Dordrecht, NL, vol. 51, No. 8, Jan. 8, 2021, pp. 5405-5419, XP037503058, ISSN: 0924-669X, DOI: 10.1007/810489-020-02026-2 [retrieved on Jan. 8, 2021] Abstract p. 6-p. 7 p. 10-p. 11 figures 3, 8.

\* cited by examiner

HIERARCHICAL EVENT REPRESENTATION IN EXTENDED DETECTION AND RESPONSE SYSTEMS

TECHNICAL FIELD

This present application pertains to the field of computer security and more specifically, to techniques for event representation in extended detection and response systems.

BACKGROUND

Extended detection and response (XDR) systems are an emerging technology for advanced threat detection and security incident response. XDR platforms integrate data from the entire information technology infrastructure of a computing system to provide unified visibility and automated actions against cyberattacks. A core challenge in XDR systems is correlating security events and identifying common patterns of event monitoring across the various monitoring event sets received from different event monitoring tools.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for generating a hierarchical representation of a set of monitoring events. In some cases, the techniques described herein relate to a method including receiving a set of monitoring events associated with a system, wherein the set of monitoring events is associated with a feature schema defining a first feature and a second feature. The method may further include determining a first entropy measure associated with the first feature and a second entropy measure associated with the second feature, wherein the first entropy measure falls below the second entropy measure. The method may further include, based at least in part on determining that the first entropy measure falls below the second entropy measure, associating the first feature with a first layer of a tree structure and the second feature with a second layer of the tree structure. The method may further include generating the tree structure based on the first layer and the second layer, wherein the first layer represents a first subset of the set of monitoring events that are associated with a first value for the first feature and a second subset of the set of monitoring events that are associated with a second value for the first feature, and the second layer represents a third subset of the first subset that are associated with a third value for the second feature and a fourth subset of the first subset that are associated with a fourth value for the second feature. The method may further include displaying a representation of the tree structure using a system administrator platform associated with the system.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for generating a hierarchical representation of a set of monitoring events. In some cases, an example system may generate a tree structure based on a set of monitoring events. The tree structure may be generated by: (i) extracting a set of feature values from the monitoring events, where the feature values may correspond to a defined set of event features, (ii) computing a set of entropy measures, each associated with one of the event features over all of the monitoring events, (iii) selecting an event feature for partitioning the events based on the entropy measures, (iv) dividing the events into subsets based on values of the selected feature, and (v) recursively partitioning the subsets based on entropy-selected features until a tree structure is formed.

For example, in some cases, given a set of N monitoring events, an example system determines a single entropy measure for a feature across all of the N monitoring events. The single entropy measure may represent a randomness, a variability, and/or an uncertainty of the distribution of values for the given feature across all of the N monitoring events. For example, given the N monitoring events and F features associated with a feature schema, the system may determine F entropy measures, where each of the F entropy measures may be associated with one of the F features and represent a randomness, a variability, and/or an uncertainty of the distribution of values for the given feature across all of the N monitoring events.

After generating the entropy measures for a set of features, an example system may use these entropy measures to generate a tree structure based on a set of monitoring events. For example, the root node of the tree structure may represent all of the monitoring events. The tree structure may also have $N_2$ second-layer nodes, where $N_2$ is the number of values of a feature having the lowest entropy measure across the set of monitoring events. For example, if the lowest-entropy feature is associated with two values across the set of monitoring events, the tree structure may have two second-layer nodes, with each second-layer node being associated with a value of the lowest-entropy feature and the second-layer nodes collectively representing a partitioning of the monitoring events based on the lowest-entropy feature. The system may then repeat this process recursively, in each iteration selecting the feature with the lowest entropy measure for further dividing the monitoring events. This approach may progressively generate additional layers of nodes in the tree structure by dividing subsets of events based on entropy-selected features. The final tree may provide a multivariate partitioning of events using feature combinations.

For example, consider an example set of N monitoring events with the following features: a source IP feature whose potential values are IP1, IP2, IP3, and IP4; a destination port whose potential values are 30, 443, and "other;" and an event type feature whose potential values are "allowed" and "blocked." If the event type feature has the lowest entropy across the set of monitoring events, the IP address feature has the second lowest entropy across the set of monitoring events, and the destination port feature has the third lowest entropy across the set of monitoring events, then the tree structure generated based on the set of monitoring events may include: (i) a root node that represents all of the set of monitoring events, (ii) a second-layer node that represents a subset of the N monitoring events that are associated with an "allowed" event type, (iii) a second-layer node that represents a subset of the N monitoring events that are associated with a "blocked" event type, (iv) a third-layer node that represents that represents a subset of the monitoring events that are associated with the "allowed" event type and an IP address of IP1, (v) a third-layer node that represents that represents a subset of the monitoring events that are associated with the "allowed" event type and an IP address of IP2, (vi) a third-layer node that represents that represents a subset of the monitoring events that are associated with the "allowed" event type and an IP address of IP3, (vii) a third-layer node that represents that represents a subset of the monitoring events that are associated with the "allowed" event type and an IP address of IP4, (viii) a third-layer node that represents that represents a subset of the monitoring events that are associated with the "blocked" event type and an IP address of IP1, (ix) a third-layer node that represents that represents a subset of the monitoring events that are associated with the "blocked" event type and an IP address of IP2, (x) a third-layer node that represents that represents a subset of the monitoring events that are associated with the "blocked" event type and an IP address of IP3, and (xi) a third-layer node that represents that represents a subset of the monitoring events that are associated with the "blocked" event type and an IP address of IP4.

In some cases, the techniques described herein improve the computational efficiency of partitioning a set of monitoring events. For example, in some cases, the techniques described herein provide a non-parametric and recursive approach for multivariate partitioning of event datasets by sequentially splitting the event dataset based on low-entropy features. This approach integrates inferences about the full dimensionality of data without incurring the exponential complexity associated with evaluating all possible combinations of feature values. By using a decision tree structure that is generated based on information gain measures (e.g., based on entropy measures), the techniques can efficiently partition multidimensional events into filtered subsets.

In some cases, the techniques described herein improve the scalability of partitioning a set of multi-dimensional monitoring events. In some cases, because partitioning monitoring events is performed in order of feature entropy, an example system may cease partitioning based on higher-entropy features if the number of features increases. Accordingly, if the dimensions associated with monitoring events increases, the system can continue partitioning events based on the top K lowest entropy features, where K may be a configurable parameter and/or a parameter determined at runtime based on available computational capacity.

Figure 1:
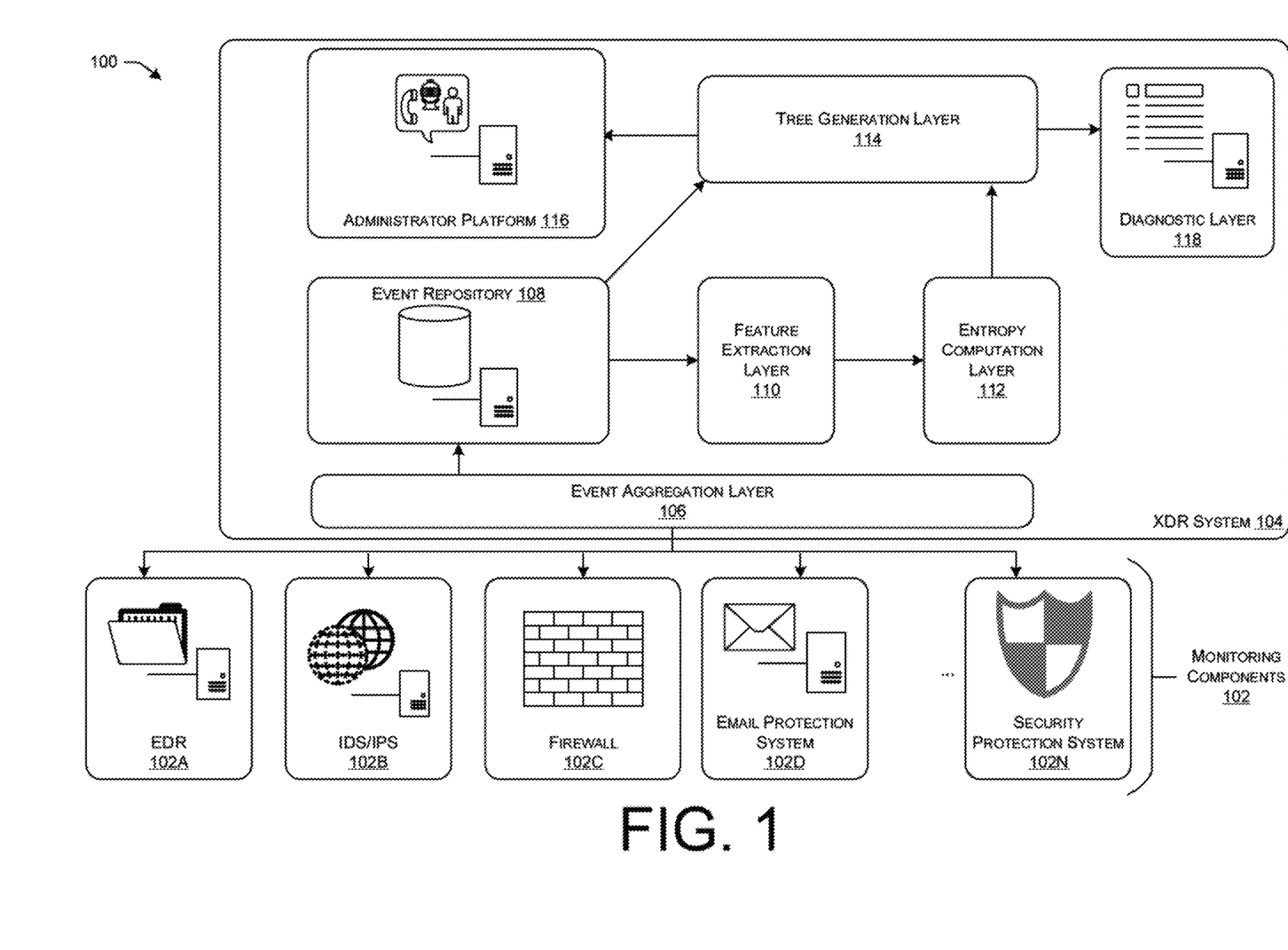
FIG. 1 depicts an example environment with an Extended Detection and Response (XDR) system that interacts with a set of monitoring components.

FIG. 1 depicts an example environment 100 with an Extended Detection and Response (XDR) system 104 that interacts with a set of monitoring components 102, such as an EDR system 102A, an Intrusion Detection System (IDS)/Intrusion Prevention System (IPS) 102B, a firewall engine 102C, an email protection system 102D, and other security protection systems 102N.

The EDR system 102A may monitor activity on endpoints such as servers, desktops, and laptops. The EDR system 102A may generate monitoring events for suspicious or malicious activity observed on endpoints. The EDR system 102A may be implemented as agent software installed on each endpoint. The agent may operate in the background, continuously collecting endpoint telemetry data and sending it to a central management console and/or the XDR system 104. The EDR agent may employ various techniques to detect threats, such as signature-based detection, behavioral analysis, and machine learning algorithms. Signature-based detection may include comparing observed activities against known patterns of malicious behavior or attack signatures. Behavioral analysis may identify anomalies and/or deviations from normal endpoint behavior which might indicate a potential threat. Machine learning algorithms may enhance detection capabilities by learning from historical data and adapting to new and emerging threats.

The IDS/IPS 102B may monitor network activity by analyzing network traffic. The IDS/IPS 102B may generate monitoring events for anomalous network traffic or known attack patterns. To achieve its monitoring and detection capabilities, the IDS/IPS 102B may use a combination of techniques, including signature-based detection, anomaly detection, and heuristic analysis. Signature-based detection involves comparing network traffic against a database of known attack signatures or patterns. Anomaly detection focuses on identifying deviations from normal network behavior, which could indicate possible intrusions or suspicious activities. Heuristic analysis involves applying predefined rules and behavioral models to detect unknown or emerging threats. In some cases, the IDS/IPS 102B performs at least one of an IDS or an IPS functionality. The IDS functionality may identify suspicious or anomalous network behaviors, such as port scans, unusual data transfer patterns, or unauthorized access attempts. The IPS functionality may take immediate action to block or prevent identified threats from progressing further into the network.

The IDS/IPS 102B may be implemented as a hardware or virtual network appliance deployed on the network. For example, the IDS/IPS 102B can be realized as a hardware appliance installed at strategic points within the network infrastructure. Alternatively, the IDS/IPS 102B may be deployed as a virtual network appliance running on virtualized servers or cloud-based instances.

The firewall engine 102C may filter incoming and outgoing network traffic according to configured rules. The firewall engine 102C may generate monitoring events when traffic is blocked or allowed. In some cases, the firewall engine 102C operates as a barrier between the internal network and the external world, controlling the flow of network traffic based on predefined rules. In some cases, the firewall engine 102C is configured to filter incoming and outgoing network traffic to enforce security policies and protect the organization's assets from unauthorized access, data exfiltration, and potential threats.

In some cases, when network packets arrive at the firewall, they are inspected against a set of configured rules and policies. These rules can be based on various criteria, such as source and destination IP addresses, port numbers, application protocols, or specific content within the packets. If a packet matches an allow rule, the firewall engine 102C permits it to pass through to its intended destination. On the other hand, if the packet matches a deny rule, the firewall engine blocks it, preventing unauthorized access or potentially malicious traffic from entering or leaving the network.

The firewall engine 102C may be implemented as a hardware or virtual network appliance. Hardware-based solutions may offer dedicated processing power for packet inspection, making them suitable for high-performance network environments where low latency is crucial. Virtual network appliances, running on virtualized servers or cloud instances, may provide flexibility and ease of management, making them ideal for dynamic and rapidly changing network infrastructures.

The email protection system 102D may scan incoming and outgoing emails for malware and spam. The email protection system 102D may generate monitoring events for blocked or allowed emails. The email protection system 102D may be implemented as a software service integrated with email servers. In some cases, the email protection system 102D continually evaluates the content, attachments, and/or sender reputation of incoming emails. To do so, the email protection system 102D may use databases of known threat signatures to identify and block emails that exhibit malicious behavior or contain harmful content. In some cases, the email protection system 102D scrutinizes outgoing emails to ensure that they do not inadvertently transmit sensitive information or include suspicious links or attachments. In some cases, whenever the email protection system 102D identifies a potentially malicious or spam email, the email protection system 102D generates monitoring events to record the incident. These monitoring events can include details such as the sender's information, recipient details, timestamp, and/or a description of the threat or spam category.

Additional security protection systems 102N may perform other types of security monitoring and generate associated monitoring events. Examples of such additional security protection systems 102N include Web Application Firewalls (WAFs), Data Loss Prevention (DLP) systems, Network Access Control (NAC) systems, threat intelligence platforms, advanced threat detection systems, Security Information and Event Management (SIEM) systems, vulnerability management systems, and Endpoint Protection Platforms (EPPs). The additional security protection systems 102N may generate monitoring events that contribute to a comprehensive security posture to enable organizations to detect and respond to cyber threats. In some cases, integration of the additional security protection systems 102N with the XDR system 104 and other security components allows for centralized management, correlation of security data, and streamlined incident response efforts.

As depicted in FIG. 1, an event aggregation layer 106 receives the monitoring events generated by the monitoring components 102 and stores those events on an event repository 108. The event repository 108 may operate as a central hub for collecting, storing, and analyzing the monitoring events generated by the various monitoring components 102. The event repository 108 may receive the monitoring events in real-time from the monitoring components 102, storing them in a structured or semi-structured format for efficient retrieval and analysis. The event repository 108 may be implemented using a database, data warehouse, and/or cloud storage. If implemented as a database, the event repository 108 might utilize NoSQL databases like Apache Cassandra or MongoDB, providing horizontal scaling capabilities to handle large volumes of data. A data warehouse approach might use solutions like Amazon Redshift or Google BigQuery to enable complex analytics and reporting on historical data. Alternatively, cloud-based object storage services like Amazon S3 or Microsoft Azure Blob Storage might be utilized.

As further depicted in FIG. 1, the XDR system 104 includes an event aggregation layer 106 that is configured to collect monitoring events generated by the monitoring components 102. The event aggregation layer 106 may, for example, receive the monitoring events in real-time from the monitoring components 102, transform the monitoring events into a unified format, and/or store the monitoring events and/or reformatted monitoring events in the event repository 108. The event aggregation layer 106 may, for example, store data determined based on the monitoring events using a structured and/or a semi-structured format.

The event repository 108 may, in some cases, be configured to receive and store the monitoring events generated by the monitoring components 102. The event repository 108 may operate as a central hub for collecting, storing, and/or analyzing the monitoring events generated by the various monitoring components 102. The event repository 108 may receive the monitoring events in real-time from the event aggregation layer 106. The event repository 108 may be implemented using a database, data warehouse, and/or cloud storage. If implemented as a database, the event repository 108 may be implemented using a structured query language (SQL) database management system (DMBS) or a non-structured query language (NoSQL) DBMS like Apache Cassandra and/or MongoDB. If implemented as a data warehouse, the event repository 108 may be implemented using a data warehousing solutions like Amazon Redshift or Google BigQuery. If implemented as a cloud storage framework, the event repository 108 may be implemented using cloud-based object storage services like Amazon S3 or Microsoft Azure Blob Storage.

As further depicted in FIG. 1, the XDR system 104 includes a feature extraction layer 110 that is configured to process the monitoring events stored in the event repository and extract a set of feature values from each stored monitoring event. For example, the feature extraction layer 110 may process a monitoring event to generate a set of feature values corresponding to a set of features. The set of features may be defined by a feature schema that is shared across at least a subset (e.g., all of the) monitoring events stored on the event repository 108. Examples of features defined by a feature schema may include source and/or destination Internet Protocol (IP) addresses, port numbers, protocols, process names, file hashes, domain names, uniform resource locators (URLs), user identifiers, hostnames, geographic locations, operating system versions, event types, timestamps, and/or threat categories.

In some cases, by generating a set of features values associated with a feature schema that is shared across the monitoring events reported by the set of monitoring components 102, the feature extraction layer 110 enables monitoring events associated with diverse sources to be normalized and/or processed in a uniform and/or consistent way. For example, an EDR monitoring event associated with a suspicious process behavior on an endpoint may be correlated with a network IDS event for command and control traffic targeting the same endpoint. In some cases, even though these two monitoring events originate from different monitoring components, extracting a common set of features like endpoint identifier, process name, an associated IP addresses, and/or the like allows these diverse events to be normalized and/or processed together.

As further depicted in FIG. 1, the XDR system 104 includes an entropy computation layer 112 that is configured to determine an entropy measure associated with a feature whose relevant feature value(s) are extracted by the feature extraction layer 110. For example, in some cases, after the feature extraction layer 110 a set of N*F feature values each associated with one of N monitoring events stored on the event repository 108 and F features associated with a feature schema (e.g., a feature schema that is shared across the N monitoring events), the entropy computation layer 112 proceeds to compute, for each of the F features, at least one entropy measure associated with the respective feature based on a distribution of values associated with the feature in at least a subset of the N monitoring events. An entropy measure may represent the randomness, variability, and/or uncertainty in the distribution of values for a given feature across at least a subset of the monitoring events. For example, in some cases, if all of the monitoring events in a selected subset (e.g., in all) of the monitoring events stored in the event repository 108 have the same feature value with respect to a first feature but at least two of the monitoring events in the event repository 108 have different values with respect to a second feature, the first feature may have a lower entropy measure relative to the entropy measure associated with the first feature.

In some cases, given a set of N monitoring events, the entropy computation layer 112 determines a single entropy measure for a feature across all of the N monitoring events. The single entropy measure may represent a randomness, a variability, and/or an uncertainty of the distribution of values for the given feature across all of the N monitoring events. For example, given the N monitoring events and F features associated with a feature schema, the entropy computation layer 112 may determine F entropy measures, where each of the F entropy measures may be associated with one of the F features and represent a randomness, a variability, and/or an uncertainty of the distribution of values for the given feature across all of the N monitoring events. In some cases, to determine the entropy measure associated with a feature d across all of the N monitoring events, the entropy computation layer 112 uses the equation $E(d) = -\Sigma_{v \in V} p(d=v) \log(p(d=v))$, where: (i) E(d) may be the entropy measure associated with d across all of the N monitoring events, (ii) v is an index variable that iterates over V potential values of d (e.g., if d is a Boolean feature, then V=[0, 1]), (iii) p(d=v) represents a ratio of the N monitoring events that have the value v for the feature d, and/or (iv) $\log(p(d=v))$ is a logarithmic normalization value generated based on the output of applying a logarithmic function to the p(d=v). $p(d=v)\log(p((d=v))$ may be referred to as a normalized ratio.

For example, consider an example scenario with N=100 monitoring events with the following features: a source IP feature whose potential values are IP1, IP2, IP3, and IP4; a destination port whose potential values are 30, 443, and "other;" and an event type feature whose potential values are "allowed" and "blocked." If sixty of the one hundred monitoring events are associated with IP1, twenty of the monitoring events are associated with IP2, fifteen of the monitoring events are associated with IP3, five of the monitoring events are associated with IP4, 40 of the monitoring events are associated with the destination port 80, thirty of the monitoring events are associated with the destination port 443, thirty of the monitoring events are associated with the destination port "other," seventy of the monitoring events are associated with the event type "allowed," and thirty of the monitoring events are associated with the event type "blocked," then the entropy computation layer 112 may determine the following entropy measure for the source IP feature, the destination port feature, and the event type feature respectively: (i) $E(\text{Source IP}) = -[(60/100)*\log_2(60/100) + (20/100)*\log_2(20/100) + (15/100)*\log_2(15/100) + (5/100)*\log_2(5/100)] = 1.53$, (ii) $E(\text{Destination Port}) = -[(40/100)*\log_2(40/100) + (30/100)*\log_2(30/100) + (30/100)*\log_2(30/100)] = 1.57$, and (iii) $E(\text{Event Type}) = -[(70/100)*\log_2(70/100) - (30/100)*\log_2(30/100)] = 0.88$.

Based on these computations, the entropy computation layer may determine that the event type feature has the lowest entropy measure, the IP address feature has the second lowest entropy measure, and the destination port feature has the highest entropy measure.

In some cases, given a set of N monitoring events, the entropy computation layer 112 determines a variable number of entropy measures for different features in the feature schema. For example, the entropy computation layer 112 may first determine F entropy measures, each of which is a single entropy measure for a corresponding one of F features across all of the N monitoring events. After computing the F entropy measures, the entropy computation layer 112 may: (i) determine that a feature $F_1$ is associated with a lowest of the F entropy measures, (ii) divide the N monitoring events based on the $V_1$ potential values of $F_1$ to generate $V_1$ event subsets, and (iii) for each of the $V_1$ event subsets: (a) determine (F−1) entropy measures each associated with one of the remaining entropy measures (i.e., for all of the F entropy measures minus $F_1$) across the respective event subset, (b) determine a feature $F_2$ is associated with lowest of the (F−1) entropy measures, and (c) divide the event subset based on the $V_2$ potential values of $F_2$ to generate $V_2$ event subsets. In some cases, the layer-by-layer entropy measure and division process described above may be repeated until all of the monitoring events are divided based on all of the features. For example, after operation (iii)(c), after operation (iii)(c), the process may repeat with computing (F−2) entropy measures for each of the V1*V2 event subsets and subsequently dividing those event subsets based on the feature associated with the lowest entropy measure, and so on.

In some cases, to determine the entropy measure associated with a feature d across a set of monitoring events (e.g., all of the monitoring events or a subset of the monitoring events determined by one or more prior divisions of the monitoring events), the entropy computation layer 112 uses the equation $E(d) = -\Sigma_{v \in V} p(d=v) \log(p((d=v))$, where: (i) E(d) may be the entropy measure associated with d across all of the set of monitoring events, (ii) v is an index variable that iterates over V potential values of d (e.g., if d is a Boolean feature, then V=[0, 1]), (iii) p(d=v) represents a portion of the N monitoring events that have the value v for the feature d, and/or (iv) log(p(d=v)) is the output of applying a logarithmic function to the p(d=v).

For example, consider an example set of N monitoring events with the following features: a source IP feature whose potential values are IP1, IP2, IP3, and IP4; a destination port whose potential values are 30, 443, and "other;" and an event type feature whose potential values are "allowed" and "blocked." In this example, the entropy computation layer 112 may first determine that, among all of the N monitoring events, the destination port feature has the highest entropy measure. Accordingly, the entropy computation layer 112 may determine that the event type feature is associated with the lowest entropy measure. Based on this determination, the entropy computation layer 112 may divide the N monitoring events into two subsets: a subset $S_1$ whose event type is "allowed" and a subset $S_2$ whose event type is "blocked." The entropy computation layer 112 may then determine that: (i) among the monitoring events in $S_1$, the destination port feature has the lowest entropy measure, and (ii) among the monitoring events in $S_1$, the IP address feature has the lowest entropy measure. Based on these determinations, the entropy computation layer 112 may determine the following subsets of monitoring events: (i) a subset $S_3$ that includes those monitoring events associated with the "allowed" event type and the 30 destination port, (ii) a subset $S_4$ that includes those monitoring events associated with the "allowed" event type and the 443 destination port, (iii) a subset $S_5$ that includes those monitoring events associated with the "allowed" event type and the "other" destination port, (iv) a subset $S_6$ that includes those monitoring events associated with the "blocked" event type and the IP address of IP1, (v) a subset $S_7$ that includes those monitoring events associated with the "blocked" event type and the IP address of IP2, (iv) a subset $S_8$ that includes those monitoring events associated with the "blocked" event type and the IP address of IP3, and (iv) a subset $S_9$ that includes those monitoring events associated with the "blocked" event type and the IP address of IP4.

The entropy computation layer 112 may then proceed to divide the sets S3, S4, and S5 based on the IP address feature. For example, the entropy computation layer 112 may determine: (i) a subset $S_{10}$ that includes those monitoring events associated with the "allowed" event type, the 443 destination port, and the IP address IP1, (ii) a subset $S_{11}$ that includes those monitoring events associated with the "allowed" event type, the 443 destination port, and the IP address IP2, (iii) a subset $S_{12}$ that includes those monitoring events associated with the "allowed" event type, the 443 destination port, and the IP address IP3, (iv) a subset $S_{13}$ that includes those monitoring events associated with the "allowed" event type, the 443 destination port, and the IP address IP4, (v) a subset $S_{14}$ that includes those monitoring events associated with the "allowed" event type, the 30 destination port, and the IP address IP1, (vi) a subset $S_{15}$ that includes those monitoring events associated with the "allowed" event type, the 30 destination port, and the IP address IP2, (vii) a subset $S_{16}$ that includes those monitoring events associated with the "allowed" event type, the 30 destination port, and the IP address IP3, (viii) a subset $S_{17}$ that includes those monitoring events associated with the "allowed" event type, the 30 destination port, and the IP address IP4, (ix) a subset $S_{18}$ that includes those monitoring events associated with the "allowed" event type, the "other" destination port, and the IP address IP1, (x) a subset $S_{19}$ that includes those monitoring events associated with the "allowed" event type, the "other" destination port, and the IP address IP2, (xi) a subset $S_{20}$ that includes those monitoring events associated with the "allowed" event type, the "other" destination port, and the IP address IP3, (xii) a subset $S_{21}$ that includes those monitoring events associated with the "allowed" event type, the "other" destination port, and the IP address IP4.

The entropy computation layer 112 may then proceed to divide the sets S6, S7, S8, and S9 based on the destination port feature. For example, the entropy computation layer 112 may determine: (i) a subset $S_{22}$ that includes those monitoring events associated with the "allowed" event type, the IP address IP1, and the "433" destination port, (ii) a subset $S_{23}$ that includes those monitoring events associated with the "allowed" event type, the IP address IP1, and the "30" destination port, (iii) a subset $S_{24}$ that includes those monitoring events associated with the "allowed" event type, the IP address IP1, and the "other" destination port, (iv) a subset $S_{25}$ that includes those monitoring events associated with the "allowed" event type, the IP address IP2, and the "433" destination port, (v) a subset $S_{26}$ that includes those monitoring events associated with the "allowed" event type, the IP address IP2, and the "30" destination port, (vi) a subset $S_{27}$ that includes those monitoring events associated with the "allowed" event type, the IP address IP2, and the "other" destination port, (vii) a subset $S_{28}$ that includes those monitoring events associated with the "allowed" event type, the IP address IP3, and the "433" destination port, (viii) a subset $S_{29}$ that includes those monitoring events associated with the "allowed" event type, the IP address IP3, and the "30" destination port, (ix) a subset $S_{30}$ that includes those monitoring events associated with the "allowed" event type, the IP address IP3, and the "other" destination port, (x) a subset $S_{31}$ that includes those monitoring events associated with the "allowed" event type, the IP address IP4, and the "433" destination port, (xi) a subset $S_{32}$ that includes those monitoring events associated with the "allowed" event type, the IP address IP4, and the "30" destination port, and (xii) a subset $S_{33}$ that includes those monitoring events associated with the "allowed" event type, the IP address IP4, and the "other" destination port.

As further depicted in FIG. 1, the XDR system 104 includes a tree generation layer 114 that is configured to generate a tree structure that represents a hierarchical partitioning of the monitoring events stored in the event repository 108 based at least in part on the entropy measures computed by the entropy computation layer 112. For example, in some embodiments, the tree generation layer 114 may initialize a root node of the tree structure to include all of the monitoring events. The tree generation layer 114 may then select a feature to partition the root node based on an entropy measure associated with the feature (e.g., select the feature having a lowest entropy measure across the monitoring events included in the root node). The tree generation layer 114 may, for example, generate child nodes of the root node by partitioning the monitoring events of the root node based on values of the selected feature. This process may be repeated recursively by the tree generation layer 114 for each node, for example by selecting features to partition based on entropy measures computed across monitoring events included in each node.

In some cases, given a set of N monitoring events and a set of F features, the tree generation layer 114 first determines which of the F features has the lowest entropy measure across the N monitoring events, which of the F features has the second lowest entropy measure across the N monitoring events, and so on. The tree generation layer 114 may then generate the tree structure by: (i) associating a root node with all of the N monitoring events, (ii) associating each second-layer node with a potential value of the feature that has the lowest entropy measure across the N monitoring events, (iii) associating each third-layer node with a potential value of the feature that has the second-lowest entropy measure across the N monitoring events, and so on. Accordingly, in some cases, each layer of the tree structure is associated with a single feature determined based on the feature entropy measures determined across all of the monitoring events. For example, each nth layer of the tree structure may be associated with a feature with the (n−1)th lowest entropy measure across all of the monitoring events, where n>=2.

For example, consider an example set of N monitoring events with the following features: a source IP feature whose potential values are IP1, IP2, IP3, and IP4; a destination port whose potential values are 30, 443, and "other;" and an event type feature whose potential values are "allowed" and "blocked." If the event type feature has the lowest entropy across the set of monitoring events, the IP address feature has the second lowest entropy across the set of monitoring events, and the destination port feature has the third lowest entropy across the set of monitoring events, then the tree structure generated based on the set of monitoring events may include: (i) a root node that represents all of the set of monitoring events, (ii) a second-layer node that represents a subset of the N monitoring events that are associated with an "allowed" event type, (iii) a second-layer node that represents a subset of the N monitoring events that are associated with a "blocked" event type, (iv) a third-layer node that represents that represents a subset of the monitoring events that are associated with the "allowed" event type and an IP address of IP1, (v) a third-layer node that represents that represents a subset of the monitoring events that are associated with the "allowed" event type and an IP address of IP2, (vi) a third-layer node that represents that represents a subset of the monitoring events that are associated with the "allowed" event type and an IP address of IP3, (vii) a third-layer node that represents that represents a subset of the monitoring events that are associated with the "allowed" event type and an IP address of IP4, (viii) a third-layer node that represents that represents a subset of the monitoring events that are associated with the "blocked" event type and an IP address of IP1, (ix) a third-layer node that represents that represents a subset of the monitoring events that are associated with the "blocked" event type and an IP address of IP2, (x) a third-layer node that represents that represents a subset of the monitoring events that are associated with the "blocked" event type and an IP address of IP3, and (xi) a third-layer node that represents that represents a subset of the monitoring events that are associated with the "blocked" event type and an IP address of IP4.

Similarly, the tree structure may include fourth-layer nodes that divide the third-layer nodes based on the highest-entropy feature, i.e., the destination port feature. For example, the third-layer node that represents that represents a subset of the monitoring events that are associated with the "allowed" event type and an IP address of IP1 may be a parent to the following fourth-layer nodes: (i) a fourth-layer node that represents a subset of the monitoring events associated with the "allowed" event type, the IP address of IP1, and a 443 destination port, (ii) a fourth-layer node that represents a subset of the monitoring events associated with the "allowed" event type, the IP address of IP1, and a 30 destination port, and (iii) a fourth-layer node that represents a subset of the monitoring events associated with the "allowed" event type, the IP address of IP1, and an "other" destination port.

As described above, in some cases, the entropy measures associated with a set of monitoring events may be recomputed at each layer. Accordingly, in some cases, the tree structure layers may be determined based on such layer-wise entropy measures, as opposed to entropy measures determined with respect to all of the monitoring events regardless of the layer.

For example, consider an example set of N monitoring events with the following features: a source IP feature whose potential values are IP1, IP2, IP3, and IP4; a destination port whose potential values are 30, 443, and "other;" and an event type feature whose potential values are "allowed" and "blocked." In this example, the entropy computation layer 112 may first determine that, among all of the N monitoring events, the destination port feature has the highest entropy measure. In this example, the first tree structure layer may be associated with a first node representing the event subset associated with the "allowed" event type and a second node representing the event subset associated with the "blocked" event type. The second tree structure layer may be associated with a third node representing the event subset associated with the "allowed" event type and the 30 destination port, a fourth node representing the monitoring events associated with the "allowed" event type and the "other" destination port, a fifth node representing the monitoring events associated with the "blocked" event type and the IP address of IP1, a sixth node representing the monitoring events associated with the "blocked" event type and the IP address of IP2, a seventh node representing the monitoring events associated with the "blocked" event type and the IP address of IP3, and/or an eighth node representing the monitoring events associated with the "blocked" event type and the IP address of IP4.

In the example described in the preceding paragraph, each of the second-layer nodes may in turn be associated with a set of third-layer nodes that depend from the respective second-layer node. For example, the third node may be the parent of a ninth node representing the monitoring events associated with the "allowed" event type, the 433 destination port, and the IP address of IP1; a tenth node representing the monitoring events associated with the "allowed" event type, the 433 destination port, and the IP address of IP2; an eleventh node representing the monitoring events associated with the "allowed" event type, the 433 destination port, and the IP address of IP3; and a twelfth node representing the monitoring events associated with the "allowed" event type, the 433 destination port, and the IP address of IP4. As another example, the eighth node may be the parent of a thirteenth node representing the monitoring events associated with the "blocked" event type, the IP address of IP4, and the 433 destination port; a fourteenth node representing the monitoring events associated with the "blocked" event type, the IP address of IP4, and the 30 destination port; and a fifteenth node representing the monitoring events associated with the "blocked" event type, the IP address of IP4, and the "other" destination port.

As further depicted in FIG. 1, the XDR system 104 includes an administrator platform 116. The administrator platform 116 may be a user interface (UI) platform that enables display of data associated with the monitoring events stored in the event repository, such as the tree structure generated by the tree generation layer 114, to a user (e.g., to an administrator user of a computer system that is being monitored and/or analyzed by the XDR system 104. The administrator platform 116 may, for example, display a graphical representation of the tree structure to the user, where different paths along the tree represent different sequences of features along which the monitoring events are hierarchically partitioned. In some cases, displaying the tree structure provides the user with visibility into which features provide the highest information gain for analyzing the monitoring events at each layer. In some cases, the administrator platform 116 may display statistics associated with the monitoring events at each node of the tree, such as a number of events associated with a node, a breakdown of event types associated with the node, a distribution of event scores associated with the node, and/or the like.

As further depicted in FIG. 1, the XDR system 104 includes a diagnostic layer 118 that may perform one or more diagnostic operations (e.g., one or more automated diagnostic operations) based on the tree structure (e.g., based on the shape of the tree structure) generated by the tree generation layer 114. For example, the diagnostic layer 118 may traverse different branches of the tree structure to determine distributions of monitoring events, compare event sets across tree branches, identify anomalies in event distributions across different tree structures, detect a security threat based on the output of processing a tree structure, classify a security threat based on the output of processing a tree structure, and/or the like. In some embodiments, the diagnostic layer 118 uses one or more machine learning models trained on tagged historical data to perform analytics across nodes and branches of the tree. For example, diagnostic layer 118 may use one or more machine learning models to process a tree structure. Examples of such models may include at least one of a random forest classifier model, a regression model, a time series forecasting model, or an unsupervised machine learning model.

In some cases, after the diagnostic layer 118 performs and/or causes performance of one or more diagnostic operations, the diagnostic layer 118 may perform one or more responsive actions and/or one or more corrective actions based on the output of the diagnostic operation(s). Examples of responsive and/or corrective actions include at least one of isolating a compromised device based on an IP address associated with a security threat, blocking network communication(s) associated with a detected threat, quarantining data implicated in malicious event(s), adjusting firewall policies in response to one or more access patterns associated with one or more detected security threats, or prompting administrative investigation of user accounts associated with one or more detected security threats.

Figure 2:
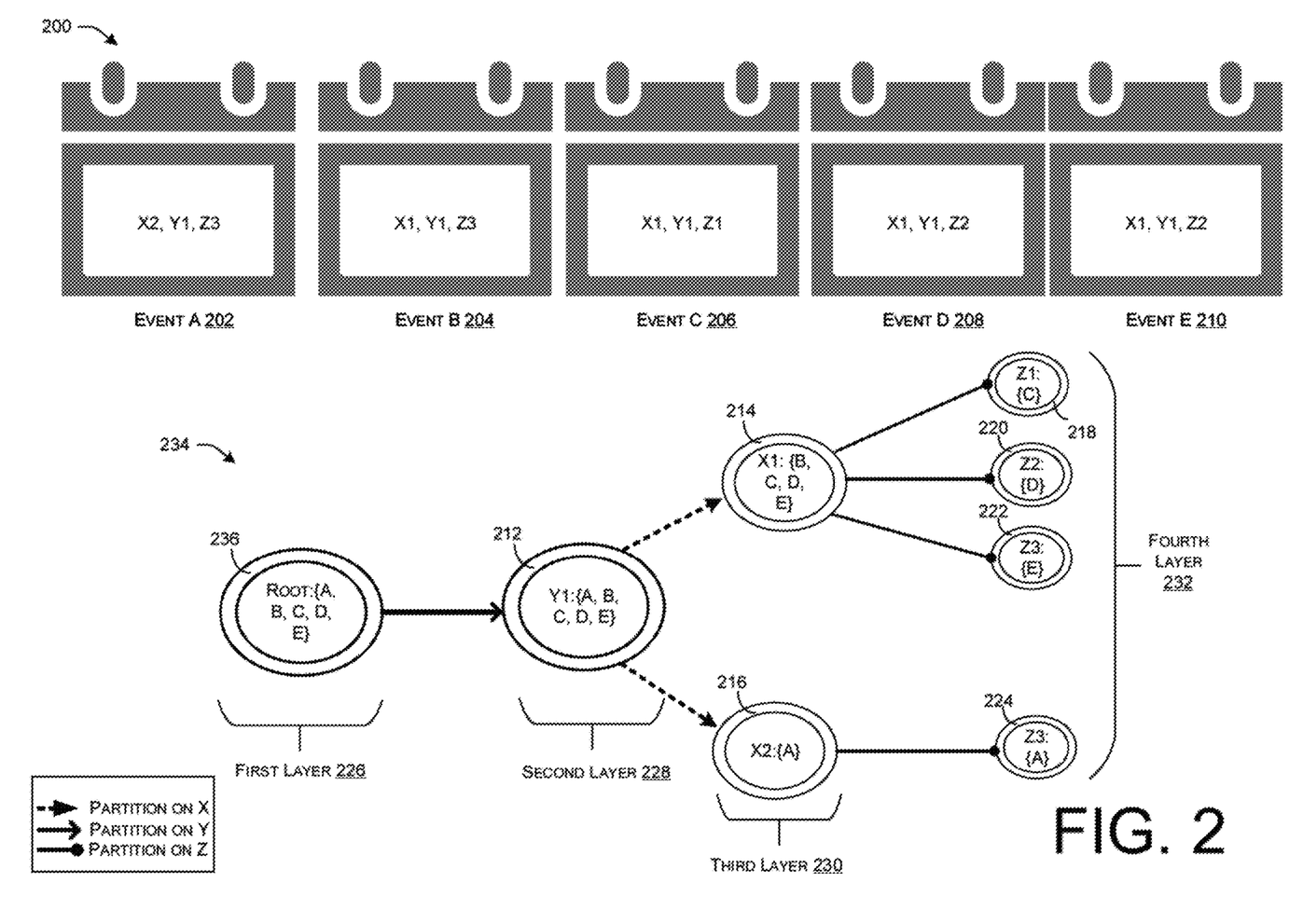
FIG. 2 provides an operational example of generating a tree structure based on holistic entropy measures associated with a set of monitoring events.

FIG. 2 provides an operational example 200 of generating a tree structure 234 based on holistic entropy measures associated with a set of monitoring events, where the holistic entropy measures are determined in relation to all of the monitoring events. As depicted in FIG. 2, the set of monitoring events are associated with three features, namely feature X with potential values X1 and X2, feature Y with potential value Y1, and feature Z with potential values Z1, Z2, and Z3. The set of monitoring events depicted in FIG. 2 include an event A 202 that is associated with feature values X2, Y1, and Z3; an event B 204 that is associated with the feature values X1, Y1, and Z3; an event C 206 that is associated with the feature values X1, Y1, and Z1; an event D 208 that is associated with the feature values X1, Y1, and Z2; and an event E 210 that is associated with the feature vales X1, Y1, and Z2.

In some cases, given the monitoring events depicted in FIG. 2, an example system may determine that the feature Y has the lowest entropy measure across the monitoring events A-E, as all of those monitoring events have the same value Y1 with respect to that feature. Accordingly, the tree structure 234 includes, as a child of the root node 236 that is associated with all of the monitoring events A-E and part of the first layer 226 of the tree structure 234, a second-layer node 212 that is associated with the second layer 228 of the tree structure 234 and the monitoring events A-E, all of which are associated with the feature value Y1 for the feature Y.

In some cases, given the monitoring events depicted in FIG. 2, an example system may determine that the feature X has the second-lowest entropy measure across the monitoring events A-E, as only one of the monitoring events A-E is associated with a non-uniform value for the feature X. Accordingly, the tree structure 234 includes, as children of the second-layer node 202: (i) a first third-layer node 214 associated with the third layer 230 and those monitoring events associated with the feature value X1 for the feature X, that is with event B 204, event C 206, event D 208, and event E 210; and (ii) a second third-layer node 216 associated with the third layer 230 and those monitoring events associated with the feature value X2 for the feature X, that is with the event A 202.

In some cases, given the monitoring events depicted in FIG. 2, an example system may determine that the feature Z has the third-lowest entropy measure across the monitoring events A-E. Accordingly, the tree structure 234 includes, as children of the third-layer node 214: (i) a first fourth-layer node 218 associated with the fourth layer 232 and those monitoring events associated with the feature value Z1 for the feature Z, that is with the event C 206; (ii) a second fourth-layer node 220 associated with the fourth layer 232 and those monitoring events associated with the feature value Z2 for the feature Z, that is with the event D 208; and (iii) a third fourth-layer node 222 associated with the fourth layer 232 and those monitoring events associated with the feature value Z3 for the feature Z, that is with the event E 210. Moreover, the tree structure 234 includes, as a child of the third-layer node 216, the fourth fourth-layer node 224 that is associated with the fourth layer 232 and those monitoring events associated with the feature value Z3 for the feature Z, that is with the event A 202.

Figure 3:
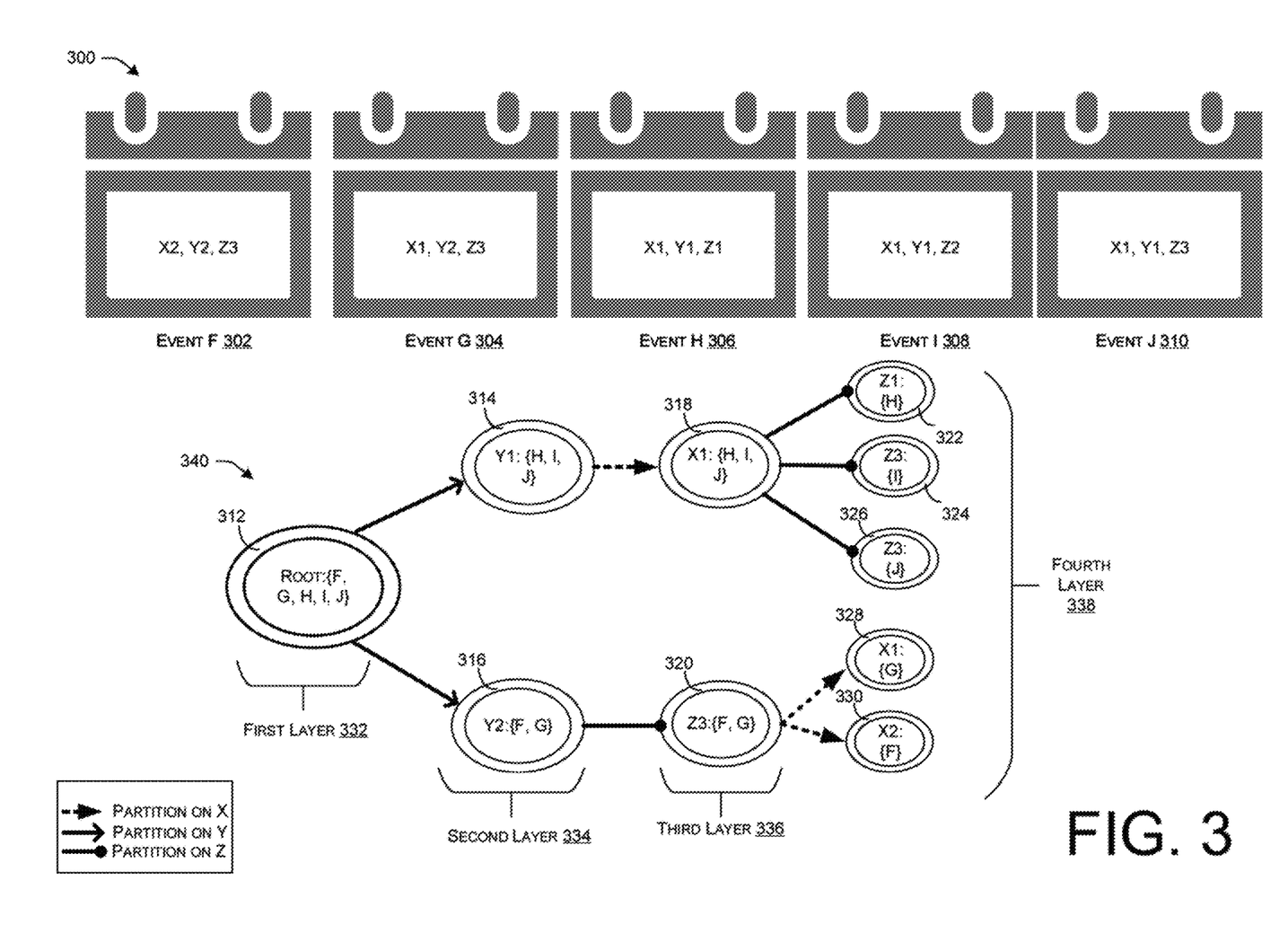
FIG. 3 provides an operational example of generating a tree structure based on layer-specific entropy measures associated with a set of monitoring events.

FIG. 3 provides an operational example 300 of generating a tree structure 340 based on layer-specific entropy measures associated with a set of monitoring events, where the layer-specific entropy measures are determined in relation to layer-specific subsets of the monitoring events. As depicted in FIG. 3, the set of monitoring events are associated with three features, namely feature X with potential values X1 and X2, feature Y with potential values Y1 and Y2, and feature Z with potential values Z1, Z2, and Z3. The set of monitoring events depicted in FIG. 3 include an event F 302 that is associated with feature values X2, Y2, and Z3; an event G 304 that is associated with the feature values X1, Y2, and Z3; an event H 306 that is associated with the feature values X1, Y1, and Z1; an event I 308 that is associated with the feature values X1, Y1, and Z2; and an event J 310 that is associated with the feature vales X1, Y1, and Z3.

In some cases, given the monitoring events depicted in FIG. 3, an example system may determine that the feature Y has the lowest entropy measure with respect to all of the events F-J. Accordingly, as children of the root node 312 that is associated with the first layer 332 of the tree structure 340, the system may generate the following nodes associated with a second layer 334: (i) a first second-layer node 314 that represents a subset of the events F-J with the value Y1 for the feature Y, that is, with event H 306, event I 308, and event J 310; and (ii) a second second-layer node 316 that represents a subset of the events F-J with the value Y2 for the feature Y, that is, with event F 302 and event G 304.

In some cases, the example system may then determine that, in relation to the events I-J associated with the first second-layer node 314, the feature X has the second-lowest entropy measure. Accordingly, as a child of the first second-layer node 314, the system may generate a first third-layer node 318 associated with the third layer 336. The first third-layer node 318 may be associated with a subset of the events I-J that have the value X1 for the feature X. Accordingly, the first third-layer node 318 may be associated with the event H 306, the event I 308, and the event J 310.

In some cases, the example system may then determine that, in relation to the events F-J associated with the second second-layer node 316, the feature Z has the second-lowest entropy measure. Accordingly, as a child of the second second-layer node 316, the system may generate a second third-layer node 320 associated with the third layer 336. The second third-layer node 320 may be associated with a subset of the events F-G that have the value Z3 for the feature Z. Accordingly, the second third-layer node 320 may be associated with the event F 302 and the event G 304.

In some cases, the example system may determine that, in relation to the events I-J associated with the first third-layer node 318, the feature Z has the third-lowest entropy measure. Accordingly, as children of the first third-layer node 318, the system may generate the following nodes associated with a fourth layer 338: (i) a first fourth-layer node 322 that represents a subset of the events I-J that are associated with the feature value Z1 for the feature Z, that is with the event H 306; (ii) a second fourth-layer node 324 that represents a subset of the events I-J that are associated with the feature value Z2 for the feature Z, that is with the event I 308; and (iii) a third fourth-layer node 326 that represents a subset of the events I-J that are associated with the feature value Z3 for the feature Z, that is with the event J 310.

In some cases, the example system may determine that, in relation to the events F-G associated with the second third-layer node 320, the feature X has the third-lowest entropy measure. Accordingly, as children of the second third-layer node 320, the system may generate the following nodes associated with a fourth layer 338: (i) a fourth fourth-layer node 328 that represents a subset of the events F-G that are associated with the feature value X1 for the feature X, that is with the event G 304; and (ii) a fifth fourth-layer node 330 that represents a subset of the events F-G that are associated with the feature value X2 for the feature X, that is with the event F 302.

Figure 4:
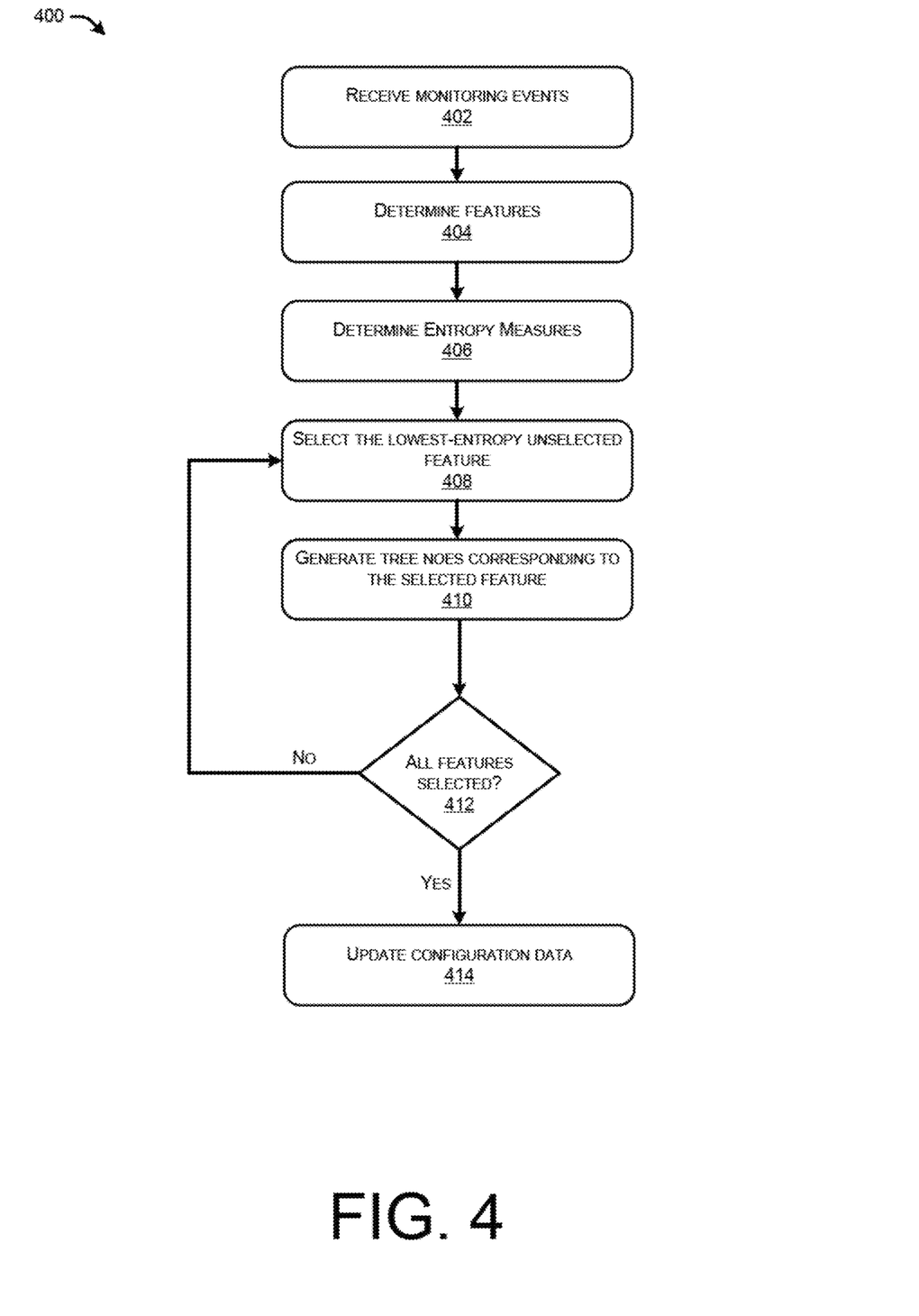
FIG. 4 is a flowchart diagram of an example process for generating a tree structure based on a set of holistic entropy measures for a set of event features.

FIG. 4 is a flowchart diagram of an example process 400 for generating a tree structure based on a set of holistic entropy measures for a set of event features. As depicted in FIG. 4, at operation 402, an example system receives a set of monitoring events. A monitoring event may represent a behavior of a monitored computer system as detected by a monitoring component. Examples of monitoring components include EDR systems, IDS/IPS systems, firewall engines, email protection systems, and/or the like.

At operation 404, the system determines a set of features for each of the monitoring events. The set of features may be defined by a feature schema. Examples of features defined by a feature schema may include source and/or destination IP addresses, port numbers, protocols, process names, file hashes, domain names, URLs, user identifiers, hostnames, geographic locations, operating system versions, event types, timestamps, and/or threat categories.

At operation 406, the system determines an entropy measure for each feature. An entropy measure may represent the randomness, variability, and/or uncertainty in the distribution of values for a given feature across at least a subset of the monitoring events.

At operation 408, the system selects a previously unselected feature that has the lowest entropy measure among the previously unselected features. In some cases, after selecting the previously unselected feature that has the lowest entropy measure among the previously unselected features, the system marks this feature as selected. In some cases, if two or more unselected features have the lowest entropy measures, then one of the two or more unselected features are selected based on one or more other measures (e.g., based on a measure determined based on domain knowledge).

At operation 410, the system generates one or more tree nodes corresponding to the feature selected at operation 408. In some cases, if the feature selected at operation 408 is associated with V potential values across the monitoring events, then the system generates V corresponding tree nodes in relation to the selected feature. For example, if the selected feature may take a first potential value and a second potential value, the system may generate a first node corresponding to the subset of monitoring events that are associated with the first potential value and/or a second node corresponding to the subset of monitoring events that are associated with the second potential value.

At operation 412, the system determines whether all features are selected. If the system determines that all features are selected (operation 412—Yes), the system proceeds to operation 414 to finalize the tree structure and add the tree structure to the configuration data associated with a monitored system. If the system determines that the at least one feature is unselected (operation 412—No), the system returns to operation 408 to select the unselected feature with the lowest entropy measure and generates nodes corresponding to this newly selected features. Operations 408-412 may be repeated until all of the feature determined at operation 404 are selected and used to update a tree structure with corresponding tree nodes.

Figure 5:
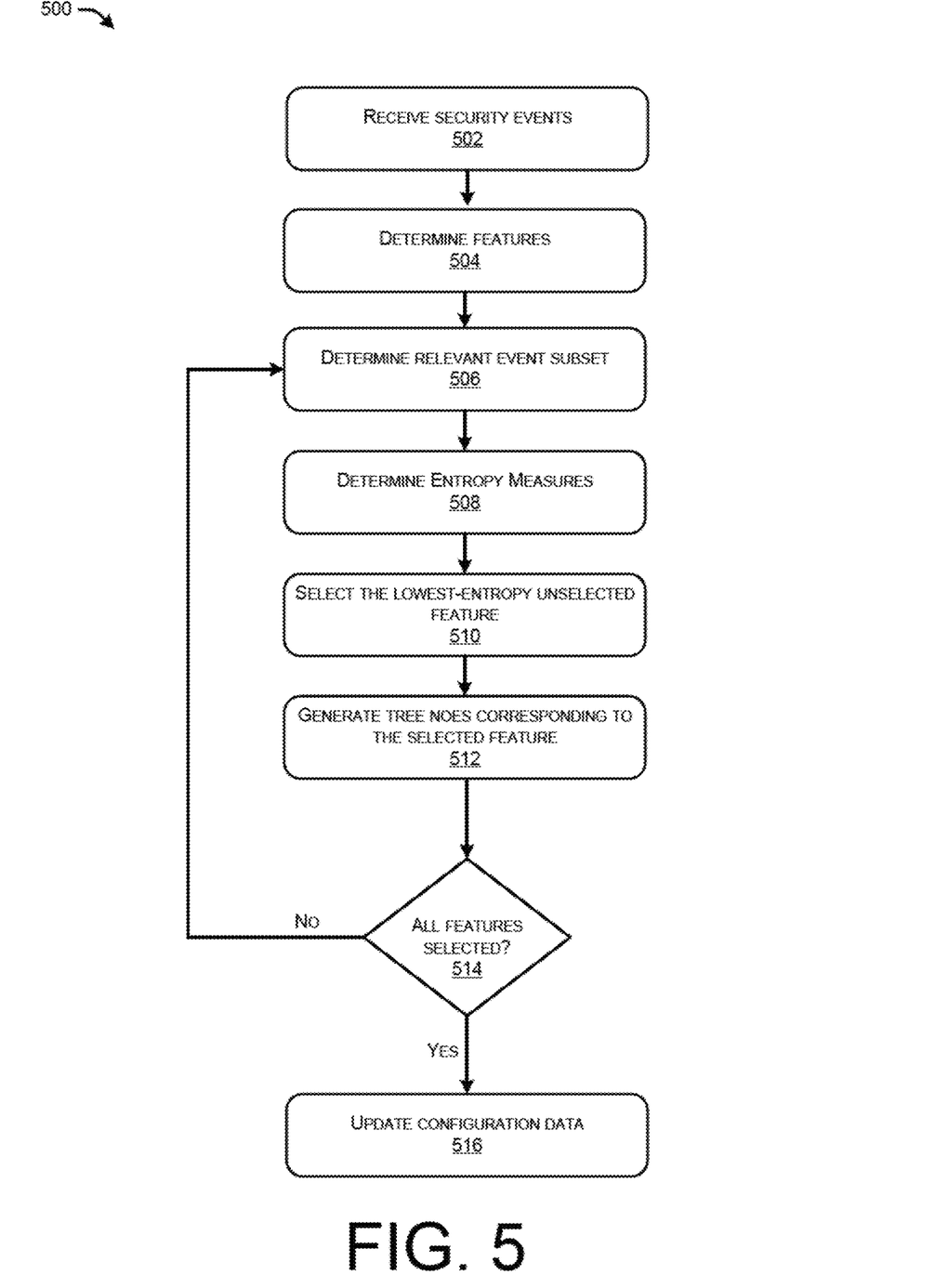
FIG. 5 is a flowchart diagram of an example process for generating a tree structure based on a set of layer-specific entropy measures for a set of event features.

FIG. 5 is a flowchart diagram of an example process 500 for generating a tree structure based on a set of layer-specific entropy measures for a set of event features. As depicted in FIG. 5, at operation 502, an example system receives a set of monitoring events. A monitoring event may represent a behavior of a monitored computer system as detected by a monitoring component. Examples of monitoring components include EDR systems, IDS/IPS systems, firewall engines, email protection systems, and/or the like.

At operation 504, the system determines a set of features for each of the monitoring events. The set of features may be defined by a feature schema. Examples of features defined by a feature schema may include source and/or destination IP addresses, port numbers, protocols, process names, file hashes, domain names, URLs, user identifiers, hostnames, geographic locations, operating system versions, event types, timestamps, and/or threat categories.

At operation 506, the system determines the relevant event subset for each entropy measure evaluation. In some cases, during an initial iteration, the relevant event subset includes all of the monitoring events received at operation 502. In some cases, during a post-initial iteration, the relevant event subset includes a subset of monitoring events determined by dividing the received set of monitoring events using a previously-selected feature.

At operation 508, the system determines an entropy measure for each feature. An entropy measure may represent the randomness, variability, and/or uncertainty in the distribution of values for a given feature across the relevant event subset determined at operation 506.

At operation 510, the system selects a previously unselected feature that has the lowest entropy measure among the previously unselected features in relation to the relevant event subset. In some cases, after selecting the previously unselected feature that has the lowest entropy measure among the previously unselected features in relation to the relevant event subset, the system marks this feature as selected. In some cases, if two or more unselected features have the lowest entropy measures, then one of the two or more unselected features are selected based on one or more other measures (e.g., based on a measure determined based on domain knowledge).

At operation 512, the system generates one or more tree nodes corresponding to the feature selected at operation 510. In some cases, if the feature selected at operation 510 is associated with V potential values across the relevant event subset, then the system generates V corresponding tree nodes in relation to the selected feature. For example, if the selected feature may take a first potential value and a second potential value, the system may generate a first node corresponding to the subset of relevant event subset that are associated with the first potential value and/or a second node corresponding to the subset of relevant event subset that are associated with the second potential value.

At operation 514, the system determines whether all features are selected in relation to the relevant event subset. If the system determines that all features are selected in relation to the relevant event subset (operation 514—Yes), the system proceeds to operation 516 to finalize the tree structure and add the tree structure to the configuration data associated with a monitored system. If the system determines that the at least one feature is unselected in relation to the relevant event subset (operation 514—No), the system returns to operation 506 to determine a new relevant event subset, use the newly-determined relevant event subset to determine entropy measures, select a feature based on the determined entropy measures, and generate tree nodes corresponding to the selected feature. Operations 506-514 may be repeated until all of the feature determined at operation 504 are selected and used to update a tree structure with corresponding tree nodes.

Figure 6:
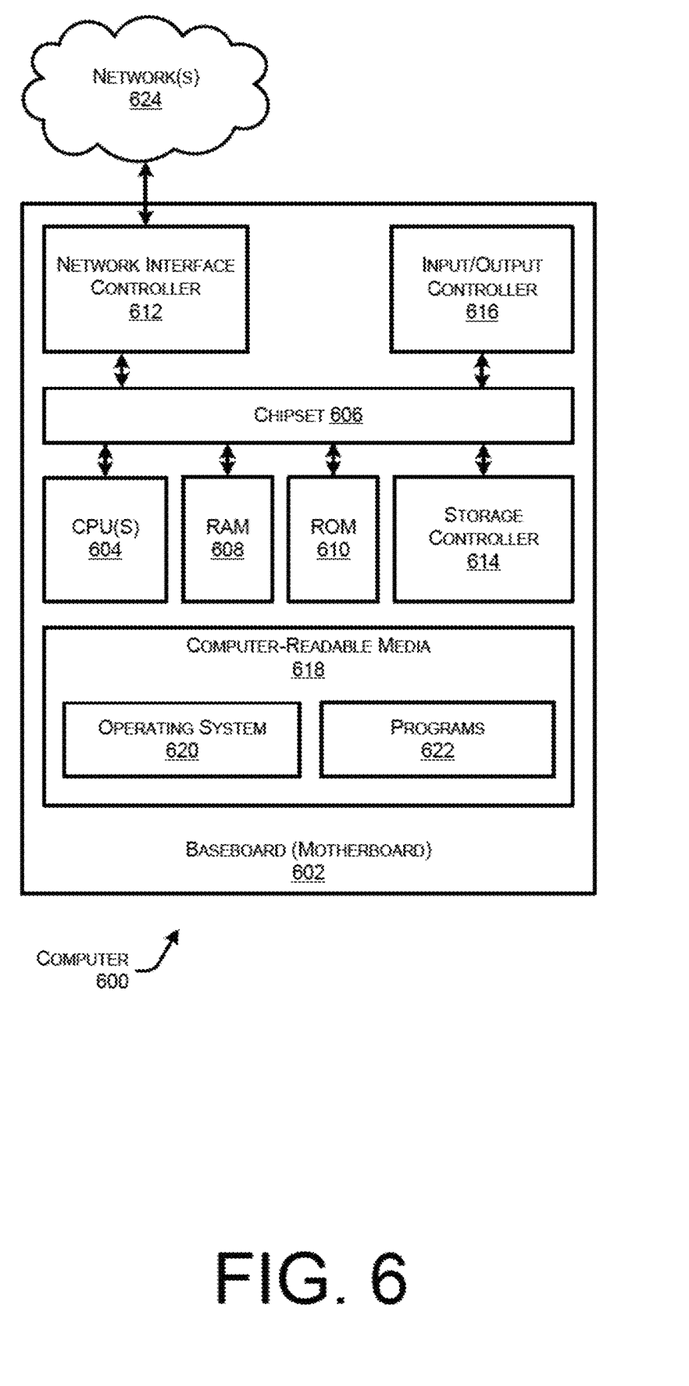
FIG. 6 shows an example computer architecture for a computing device capable of executing program components for implementing the functionality described above.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network 624. The chipset 606 can include functionality for providing network connectivity through a NIC 612, such as a gigabit Ethernet adapter. The NIC 612 is capable of connecting the computing device 600 to other computing devices over the network. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by a network, and/or any components included therein (e.g., a router, such as an edge router), may be supported by one or more devices similar to computing device 600. Stated otherwise, some or all of the operations performed by the network, and or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

The computing device 600 may support a virtualization layer, such as one or more components associated with a computing resource network. The virtualization layer may provide virtual machines or containers that abstract the underlying hardware resources and enable multiple operating systems or applications to run simultaneously on the same physical machine. The virtualization layer may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 600 may also support other software layers, such as middleware, application frameworks, or databases, that provide additional abstraction and services to application developers and users. In some cases, the computing device 600 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, by a processor, a set of monitoring events associated with a system, wherein the set of monitoring events is associated with a feature schema defining a first feature and a second feature;

determining, by the processor, a first entropy measure associated with the first feature and a second entropy measure associated with the second feature, wherein the first entropy measure falls below the second entropy measure, and wherein determining the first entropy measure comprises determining a first ratio of the set of monitoring events that are associated with a first value for the first feature and a second ratio of the set of monitoring events that are associated with a second value for the first feature;

based at least in part on determining that the first entropy measure falls below the second entropy measure, associating, by the processor, the first feature with a first layer of a tree structure and the second feature with a second layer of the tree structure;

generating, by the processor, the tree structure based on the first layer and the second layer, wherein:

the first layer represents a first subset of the set of monitoring events that are associated with the first value for the first feature and a second subset of the set of monitoring events that are associated with the second value for the first feature, and the second layer represents a third subset of the first subset that are associated with a third value for the second feature and a fourth subset of the first subset that are associated with a fourth value for the second feature; and displaying, by the processor, a representation of the tree structure using a system administrator platform associated with the system.

2. The method of claim 1, wherein determining the first entropy measure comprises:
determining a first logarithmic normalization value based on the first ratio and a second logarithmic normalization value based on the second ratio;
determining a first normalized ratio based on the first ratio and the first logarithmic normalization value;
determining a second normalized ratio based on the second ratio and the second logarithmic normalization value; and
determining the first entropy measure based on the first normalized ratio and the second normalized ratio.

3. The method of claim 1, wherein the second layer further represents:
a fifth subset of the second subset that are associated with the third value for the second feature, and
a sixth subset of the second subset that are associated with the fourth value for the second feature.

4. The method of claim 3, wherein:
the feature schema further defines a third feature, and
the first entropy measure and the second entropy measure fall below a third entropy measure associated with the third feature.

5. The method of claim 1, wherein the second entropy measure represents an entropy of the second feature in relation to the first subset.

6. The method of claim 5, wherein:
the feature schema further defines a third feature,
the third feature is associated with a third entropy measure with respect to the second subset that falls below a fourth entropy measure associated with the second feature with respect to the second subset,
the third feature is associated with a fifth entropy measure with respect to the first subset that falls below the second entropy measure, and
the second layer further represents a fifth subset of the second subset that are associated with a fifth value for the third feature and a sixth subset of the second subset that are associated with a sixth value for the third feature.

7. The method of claim 1, further comprising:
receiving, by the processor, a user selection of the first feature and the second feature from a plurality of features defined in the feature schema.

8. The method of claim 1, further comprising:
determining a monitoring event based on a shape of the tree structure.

9. A system comprising:
one or more processors; and
one or more non-transitory computer-readable media storing computer-executable instructions that, when executed by the one or more processors, cause the one or more processors to perform operations comprising:
receiving a set of monitoring events associated with a system, wherein the set of monitoring events is associated with a feature schema defining a first feature and a second feature;
determining a first entropy measure associated with the first feature and a second entropy measure associated with the second feature, wherein the first entropy measure falls below the second entropy measure, and wherein determining the first entropy measure comprises determining a first ratio of the set of monitoring events that are associated with a first value for the first feature and a second ratio of the set of monitoring events that are associated with a second value for the first feature;
based at least in part on determining that the first entropy measure falls below the second entropy measure, associating the first feature with a first layer of a tree structure and the second feature with a second layer of the tree structure;
generating the tree structure based on the first layer and the second layer, wherein:
the first layer represents a first subset of the set of monitoring events that are associated with the first value for the first feature and a second subset of the set of monitoring events that are associated with the second value for the first feature, and
the second layer represents a third subset of the first subset that are associated with a third value for the second feature and a fourth subset of the first subset that are associated with a fourth value for the second feature; and
displaying a representation of the tree structure using a system administrator platform associated with the system.

10. The system of claim 9, wherein determining the first entropy measure comprises:
determining a first logarithmic normalization value based on the first ratio and a second logarithmic normalization value based on the second ratio;
determining a first normalized ratio based on the first ratio and the first logarithmic normalization value;
determining a second normalized ratio based on the second ratio and the second logarithmic normalization value; and
determining the first entropy measure based on the first normalized ratio and the second normalized ratio.

11. The system of claim 9, wherein the second layer further represents:
a fifth subset of the second subset that are associated with the third value for the second feature, and
a sixth subset of the second subset that are associated with the fourth value for the second feature.

12. The system of claim 11, wherein:
the feature schema further defines a third feature, and
the first entropy measure and the second entropy measure fall below a third entropy measure associated with the third feature.

13. The system of claim 9, wherein the second entropy measure represents an entropy of the second feature in relation to the first subset.

14. The system of claim 13, wherein:
the feature schema further defines a third feature,
the third feature is associated with a third entropy measure with respect to the second subset that falls below a fourth entropy measure associated with the second feature with respect to the second subset,
the third feature is associated with a fifth entropy measure with respect to the first subset that falls below the second entropy measure, and
the second layer further represents a fifth subset of the second subset that are associated with a fifth value for the third feature and a sixth subset of the second subset that are associated with a sixth value for the third feature.

15. The system of claim 9, the operations further comprising:

receiving a user selection of the first feature and the second feature from a plurality of features defined in the feature schema.

16. The system of claim 9, the operations further comprising:
determining a monitoring event based on a shape of the tree structure.

17. One or more non-transitory computer-readable media storing computer-executable instructions that, when executed by one or more processors, cause the one or more processors to perform operations comprising:
receiving a set of monitoring events associated with a system, wherein the set of monitoring events is associated with a feature schema defining a first feature and a second feature;
determining a first entropy measure associated with the first feature and a second entropy measure associated with the second feature, wherein the first entropy measure falls below the second entropy measure, and wherein determining the first entropy measure comprises determining a first ratio of the set of monitoring events that are associated with a first value for the first feature and a second ratio of the set of monitoring events that are associated with a second value for the first feature;
based at least in part on determining that the first entropy measure falls below the second entropy measure, associating the first feature with a first layer of a tree structure and the second feature with a second layer of the tree structure;
generating the tree structure based on the first layer and the second layer, wherein:
the first layer represents a first subset of the set of monitoring events that are associated with the first value for the first feature and a second subset of the set of monitoring events that are associated with the second value for the first feature, and
the second layer represents a third subset of the first subset that are associated with a third value for the second feature and a fourth subset of the first subset that are associated with a fourth value for the second feature; and
displaying a representation of the tree structure using a system administrator platform associated with the system.

18. The one or more non-transitory computer-readable media of claim 17, wherein determining the first entropy measure comprises:
determining a first logarithmic normalization value based on the first ratio and a second logarithmic normalization value based on the second ratio;
determining a first normalized ratio based on the first ratio and the first logarithmic normalization value;
determining a second normalized ratio based on the second ratio and the second logarithmic normalization value; and
determining the first entropy measure based on the first normalized ratio and the second normalized ratio.

19. The one or more non-transitory computer-readable media of claim 17, wherein the second layer further represents:
a fifth subset of the second subset that are associated with the third value for the second feature, and
a sixth subset of the second subset that are associated with the fourth value for the second feature.

20. The one or more non-transitory computer-readable media of claim 19, wherein:
the feature schema further defines a third feature, and
the first entropy measure and the second entropy measure fall below a third entropy measure associated with the third feature.

\* \* \* \* \*